United States Patent
Barbeau et al.

(10) Patent No.: US 7,722,292 B2
(45) Date of Patent: May 25, 2010

(54) SOIL DECONTAMINATION BY MECHANICALLY ACTIVATED OXIDATION

(75) Inventors: Mathieu Barbeau, Montreal (CA); Eric Bergeron, Montreal (CA)

(73) Assignee: Golder Associates Ltd, Montreal, Quebec (CA)

( * ) Notice: Subject to any disclaimer, the term of this patent is extended or adjusted under 35 U.S.C. 154(b) by 210 days.

(21) Appl. No.: 11/715,383

(22) Filed: Mar. 8, 2007

(65) Prior Publication Data

US 2008/0221380 A1 Sep. 11, 2008

(51) Int. Cl.
B09C 1/00 (2006.01)

(52) U.S. Cl. ............................. 405/128.75; 588/320

(58) Field of Classification Search ............ 405/128.75; 588/320
See application file for complete search history.

(56) References Cited

U.S. PATENT DOCUMENTS

| | | | |
|---|---|---|---|
| 3,876,439 A * | 4/1975 | Schneider ............... 106/287.17 |
| 5,286,141 A | 2/1994 | Vigneri |
| 5,520,483 A | 5/1996 | Vigneri |
| 5,525,008 A | 6/1996 | Wilson |
| 5,536,875 A | 7/1996 | Roby et al. |
| 5,611,642 A | 3/1997 | Wilson |
| 5,615,974 A | 4/1997 | Land et al. |
| 5,741,427 A | 4/1998 | Watts et al. |
| 5,967,230 A | 10/1999 | Cooper et al. |
| 6,019,548 A * | 2/2000 | Hoag et al. ............... 405/128.5 |
| 6,102,621 A | 8/2000 | Siegrist et al. |
| 6,315,494 B1 * | 11/2001 | Oberle ..................... 405/128.5 |
| 6,474,908 B1 | 11/2002 | Hoag et al. |
| 7,160,483 B1 | 1/2007 | Hince |
| 2001/0038773 A1 * | 11/2001 | Bruso .................... 405/128.35 |

FOREIGN PATENT DOCUMENTS

| | | |
|---|---|---|
| CA | 2441259 | 11/2002 |
| CA | 2567338 | 12/2005 |

OTHER PUBLICATIONS http://www.ceaa.gc.ca/050/DocViewer_e.cfm?DocumentID=839, retrieved from internet Oct. 14, 2008.*

Adriana Peisajovich Démantèlement des reservoirs et traitement des sols par Oxydation chimique en réacteurs (Treatment the soil by chemical oxydation and dismantle the bulk oil storage and pipeline), Processus d'évaluation et d'examen en matière d'environnement (PEEE), Jun. 4, 2004, 4 pages, Canada.

(Continued)

Primary Examiner—John Kreck
(74) Attorney, Agent, or Firm—Ogilvy Renault LLP (57) ABSTRACT

A method of performing soil decontamination including mechanically mixing the soil with solid oxidant prior to any addition of water and until an exothermic reaction between the oxidant and contaminants within the soil occur, adding only necessary water to obtain an homogeneous mix between the soil and the oxidant, and mechanically mixing the soil with the oxidant and the water for a predetermined period of time to allow the oxidant to at least partially oxidize the contaminants.

23 Claims, 3 Drawing Sheets

OTHER PUBLICATIONS

Canadian Environmental Assessment Registry, Site Remediation and Decommissioning of Pipeline and Tankfarm at the Former Nitchenquon Meteoroligal Station—Decision—Mar. 4, 2005, 1 page, Canada.

Canadian Environmental Assessment Registry, Site Remediation and Decommissioning of Pipeline and Tankfarm at the Former Nitchequon Meteoroligal Station—Notice of Commencement of an environmental assessment—Mar. 4, 2005, 4 pages, Canada.

Peisajovich, A. et al., Projet Nitchequon: Logistique et gestion d'un projet de décontamination en milieu nordique isolé, Proceedings of the 2006 Federal Contaminated Sites National Worksop (CD-Rom), Mar. 2006, Real Property Institute of Canada, Canada.

The Nitchequon project: Remediation of a former meteorological station Year 1 (poster), Apr. 2006, canada.

The Nitchequon project: Remediation of a former meteorological station Year 2 (poster), Apr. 2006, Canada.

Bergeron, E. et al., Field Pilot Testing for Chemical Oxidation at the former Nitchequon Meteorological Station (poster), Oct. 2003, Conference in Boston, USA.

* cited by examiner

SOIL DECONTAMINATION BY MECHANICALLY ACTIVATED OXIDATION

FIELD OF THE INVENTION

The present invention relates to a method for soil decontamination, more particularly to such a method for remediation of contaminants in soil by chemical oxidation.

BACKGROUND ART

During the last decade, chemical oxidation has been developed and demonstrated as an in-situ and ex-situ remediation approach for cleanup of contaminated sites. Remediation of soil and/or groundwater contamination using in situ and ex-situ chemical oxidation generally involves injecting oxidants and other amendments directly into the source zone, in down gradient plume or in a reactor. Oxidants commonly used with chemical oxidation include, for example, hydrogen peroxide (Fenton's reagent), potassium permanganate and ozone. More recently, sodium persulfate, an alternate oxidant, has been tested and reported in various technical papers.

The following table provides an example of main characteristic comparisons between Fenton's reagent, permanganate and sodium persulfate:

TABLE 1

| Technology features | Fenton's Reagent | Permanganate | Sodium Persulfate |
|---|---|---|---|
| Physical state | Liquid | Solid | Liquid |
| Molecular composition | OH• | $MnO_4^-$ | $SO_4^-$• |
| Required Catalyst | Ferrous iron | None | Ferrous iron or thermal activation |
| Oxidation Potential | 2.8 V | 1.7 V | 2.6 V |
| Reaction time | Very fast (minutes-hours) | Very Slow (Days-weeks) | Slow (hours-days) |
| By-product | Ferric iron, $O_2$ and $H_2O$ | $MnO_2$ | Ferric iron and $SO_4$ |
| Gas evolution | High ($CO_2$) | Low | Low |
| Permeability loss | High | High | Low |
| Heat | High | Low | Low |
| Dosage concentrations | 5-20% | Up to 65 g/l @ 20° C. | Up to 55% |
| Petroleum hydrocarbons | Good-Excellent | Poor | Good-Excellent |
| Metal mobilization | Possible | Possible | Possible |

Permanganates have been used for many years for the treatment of wastewater. Potassium or sodium permanganates are generally used to oxidize contaminants directly without a catalyst or pH control. Although the oxidation power of the permanganate is higher in neutral conditions (e.g. pH of 7 to 8), it is still effective over a wide pH range. The oxidation reaction produces carbon dioxide, intermediate organic compounds and manganese oxide ($MnO_2$).

The simplified stoichiometric equation that represents the permanganate chemical oxidation of organic contaminants (R) is the following:

$$R + MnO_4^- \rightarrow MnO_2 + CO_2 \text{ or } R_{ox} + \ldots$$

where $R_{ox}$ represents the oxidized intermediate organic compounds.

Unfortunately, $MnO_2$ precipitation can result in a high permeability loss when used for in-situ treatment and the injection of permanganate can result in the mobilization and transformation of inorganic constituents such as chromium.

Although permanganate is generally more stable for example than Fenton's reagent, can usually migrate further into the subsurface and is thus more persistent, permanganate is generally not the chemical oxidant of choice for hydrocarbon contaminated soil remediation, as by comparison to more widely used oxidants, the use of permanganate generally results in relatively slow kinetics and low oxidation potential. For example, the oxidation potential of permanganate is approximately 40% lower than that of Fenton's Reagent. In addition, permanganate is usually not effective on a variety of petroleum hydrocarbons such as for example diesel, heavy PAHs, etc.

Accordingly, there is a need for an improved soil decontamination method using permanganate.

SUMMARY OF INVENTION

It is therefore an aim of the present invention to provide an improved method for soil decontamination.

Therefore, in accordance with the present invention, there is provided a method for decontaminating soil comprising (a) adding solid oxidant to the soil, (b) mechanically mixing the oxidant with the soil until an exothermic reaction occurs between the oxidant and contaminants within the soil, (c) adding water to obtain a homogeneous mix between the soil and the oxidant while keeping a temperature of the soil above a minimum temperature threshold, (d) mechanically mixing the soil with the oxidant and the water until the reaction between the oxidant and the contaminants is determined to have slowed down below a given threshold, and (e) ensuring that a pH of the soil is substantially neutral after step (d) by adding acid to the soil at any time after step (a).

Also in accordance with the present invention, there is provided a method of performing soil decontamination comprising mechanically mixing the soil with a solid oxidant prior to any addition of water and until an exothermic reaction between the oxidant and contaminants within the soil occur, adding only necessary water to obtain an homogeneous mix between the soil and the oxidant, and mechanically mixing the soil with the oxidant and the water for a predetermined period of time to allow the oxidant to at least partially oxidize the contaminants.

BRIEF DESCRIPTION OF THE DRAWINGS

Reference will now be made to the accompanying drawings, showing by way of illustration a particular embodiment of the present invention and in which.

DETAILED DESCRIPTION OF PARTICULAR EMBODIMENTS

The present invention presents an enhanced method to perform remediation of contaminants in soils using mechanically activated permanganate oxidation. The chemical oxidation used includes breaking down the hydrocarbons into carbon dioxide, water and smaller chain of hydrocarbon compounds using permanganate. The oxidation process takes place by mixing soil impacted by an organic contaminant with a sufficient quantity of permanganate using high energy mechanical mixing. The mechanical mixing of solid potassium permanganate and native soil, in-situ or ex-situ, activates the permanganate. The activated permanganate oxidation is exothermic and the half-life of the hydrocarbons is less than 24 hours. The rate of oxidation and efficiency reached with this new process is much higher than conventional permanganate oxidation.

The oxidation method presented herein is particularly suited to the chemical oxidation of petroleum hydrocarbon, halogenated hydrocarbons, phenols compounds, PAHs, MTBE, carbon tetrachloride, ethane compounds (TCA, DCA, etc. . . . ), PCBs, pesticides and energetic compounds.

Figure 1:
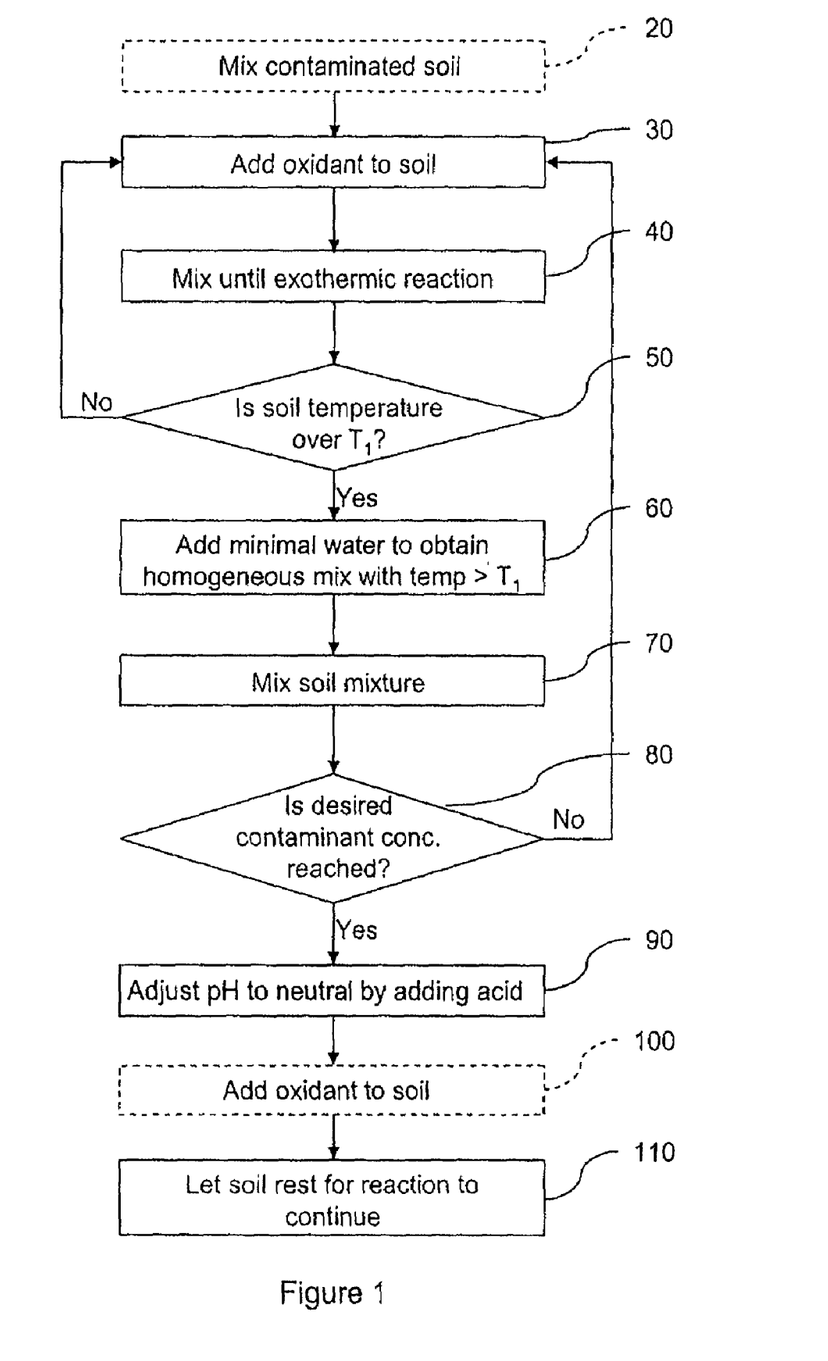
FIG. 1 is a flow chart of a decontamination method according to a particular embodiment of the present invention.

FIG. 1 is a schematic representation of an oxidation method or process according to a particular embodiment of the present invention. The method according to a particular embodiment will be described herein with permanganate being used as the oxidant. However, any other adequate solid oxidant can alternately be used.

Before the oxidation process begins, the quantity of oxidant necessary to achieve the desired contaminant reduction is preferably determined. In a particular embodiment, this is done by testing samples of the contaminated soil in a laboratory environment to determine the contaminant of concern oxidation demand (CCOD), by mixing each soil sample with a particular quantity of oxidant and determining the resulting oxidation of the contaminants, such as to establish a dosing curve for the oxidant for the particular type of contaminated soil.

The natural oxidant demand (NOD) of the soil as well as the contaminant concentration in the soil are also preferably determined, in order to facilitate the interpretation of the dosing curve and its relevance with regard to different contaminated soils, since both parameters have an influence on the quantity of oxidant necessary to achieve the desired contaminant reduction.

In a particular embodiment, the NOD of the soil is determined using standard methods, for example by combining a non contaminated sample of the soil with oxidant and with water to obtain a slurry, and determining the amount of oxidant reacting with the soil such as to establish a dosing curve. In an alternate embodiment, the soil and oxidant are mechanically mixed during the reaction using a high energy mixer and preferably in a continuous manner, in order to increase the similarities between the method used to determine the NOD and the soil oxidation method described below.

The contaminant concentration is preferably determined using standard laboratory methods by an appropriate accredited laboratory, for example complying with standards set forth by the MDDEP (Ministère du Développement durable, Environnement et Parcs) in Canada or by the EPA (Environmental Protection Agency) in the U.S.A. In a particular embodiment, the contaminant concentration is determined using gas chromatography.

As shown in step 20, the soil is optionally mixed before the permanganate is added, whether in situ or ex-situ, such as to ensure homogeneity. This preliminary mixing step is preferably performed in order to facilitate the subsequent mixing of the permanganate with the soil, but can be omitted.

Solid permanganate, which in a particular embodiment is potassium permanganate ($KMnO_4$), is then added to the soil as shown in step 30. Preferably, and especially in cases where the quantities of contaminants to oxidize are relatively high, only a fraction of the total necessary quantity of permanganate as determined in the laboratory test is added, and the method is performed in an iterative manner, as will be further detailed below. This minimizes the portion of the permanganate which breaks down without acting on the soil contaminants, thus reducing the total amount of permanganate used.

Then, as shown in step 40, the permanganate and soil are mechanically mixed to activate the permanganate until an exothermic reaction occurs between the permanganate and the soil contaminants, for example for a period ranging from 5 to 20 minutes. Any appropriate type of mechanical mixing can be used, for example U shaped mixers, cement mixers, rotative mixers, auger mixers, etc. In a preferred embodiment, the soil is excavated and mixed with the permanganate ex-situ in a mechanical mixer. Alternately, the mechanical mixing can be done in-situ, for example, using an auger to mix the soil and the solid permanganate and perform the activation. The mixing is preferably performed in a continuous manner.

The exothermic reaction between the permanganate and the contaminants causes the soil temperature to rise relatively quickly, for example from ambient temperature up to over 100° C. in less than 5 minutes. In the embodiment shown and in order to achieve appropriate reaction efficiency, the permanganate is added in sufficient quantity to ensure that the temperature of the soil rises above a minimal temperature $T_1$. As such, as indicated at step 50, the steps 30, 40 of adding permanganate and subsequently mixing until the exothermic reaction occurs are repeated until the minimum soil temperature $T_1$ is reached.

Although the minimum soil temperature $T_1$ can be selected such as to correspond to a soil temperature increase slightly higher than the soil temperature increase produced by the friction of the mechanical mixing action alone (e.g. 1-5° C. higher than the ambient soil temperature, depending on the type of mixer used), in a particular embodiment the minimum soil temperature $T_1$ is preferably between about 40° C. and about 80° C., and more preferably approximately 60° C.

In a particular embodiment where $T_1$ is 60° C., the concentration of $KMnO_4$ added to ensure that the reaction starts and that the soil temperature is above $T_1$ is between approximately 5 g $KMnO_4$/g of contaminant and 20 g $KMnO_4$/g of contaminant.

The minimum soil temperature $T_1$ to be reached must also be selected such as not to exceed a maximum safe soil temperature, in order to ensure the safety of the process. In a particular embodiment, the maximum safe temperature is set such as to correspond to the lower of the temperature causing the concentration of gas produced by the reaction to reach 20% of the lower flammable or explosive limit (LEL), and 80% of the lowest autoignition temperature of the contaminants within the soil.

The chemical reaction between the permanganate and the contaminants thus releases heat and vapor. The high soil temperature advantageously increases the kinetics of the reaction as described by the known Arrhenius equation (Elements of Chemical Reaction Engineering, second edition, H. Scott Fogler, 1992), and increases the desorption of contaminant from the soil matrix and the efficiency of the process. The permanganate and heat is distributed into the soil through the mechanical mixing action.

When the soil temperature is above $T_1$, a minimum quantity of water is added to the mix to form a homogenous mix between the permanganate and the soil, as indicated in step 60. The added water acts to blend the $KMnO_4$ uniformly to optimize the contact between the soil particles and the $KMnO_4$, and to promote liquid phase reaction within the soil. However, the water quantity is kept to a minimum such as not to lower the soil temperature below $T_1$, which would reduce the efficiency of the process. Preferably, the water is added such that the soil mixture retains a very dry, bitumen-like consistency. In a particular embodiment, the water content is adjusted to between approximately 5% W/W and approximately 8% W/W.

The mixture of soil, permanganate and water is then mechanically mixed as indicated in step 70, preferably in a continuous manner. Alternately, and depending on the available power from the mixer, the mechanical mixing action can be performed in a stepped manner, i.e. alternating periods where the mixer is turned on and off. In a particular embodiment, the mechanical mixing is performed for a period ranging between 4 and 20 hours. During the mechanical mixing step 70, the water added to the soil mixture progressively evaporates, and the consistency of the soil mixture progressively returns to the powder-like state the mixture initially had before the addition of water. Additional water can be added if the soil becomes too dry before the reaction is determined to have slowed down below a given threshold, as further detailed below.

During the initial mechanical mixing of step 40 and the subsequent mechanical mixing shown of 70, the gases produced by the oxidation process are vented. Depending on the nature and quantity of the released gases during the oxidation process, filtering means might be required to filter the gases before releasing them to the atmosphere. However, in a particular embodiment, gas evolution is sufficiently low that no filtering means are required.

The mechanical mixing step 70 is performed until the reaction is determined to have slowed down below a given threshold. The soil temperature progressively increases during the mechanical mixing step 70 as the permanganate reacts with the soil and its contaminants, and starts decreasing when the reaction slows down. Moreover, the addition of permanganate in the soil mixture usually causes the soil mixture to change color and become violet, the violet color fading as the permanganate reacts with the soil and its contaminants, with black $MnO_2$ particles appearing in the soil mixture as the reaction progresses. The decrease in soil temperature or the fading of the violet tint of the soil, or both, can be used as indicators to characterize the reaction as having slowed down below the given threshold, thus the end of the mechanical mixing step 70. Other characteristics can alternately be used to make that determination, such as for example the remaining contaminant concentration within the soil.

As indicated in step 80, the soil mixture is evaluated after the mechanical mixing step 70 to determine if a predetermined desired contaminant concentration is reached. In a particular embodiment, this is done by determining the contaminant concentration in the soil. However, such testing might not be necessary in a case where only a fraction of the total necessary permanganate quantity as determined by the laboratory tests was added in step 30, and it can thus be supposed that the desired contaminant concentration has not been reached yet.

The desired contaminant concentration is set based on the final contaminant concentration required in the decontaminated soil, which is for example based on local environmental requirements. In a particular embodiment, the desired contaminant concentration to reach is set to be substantially close to the final contaminant concentration required in the decontaminated soil, for example to correspond to between 0-5% of the overall contaminant reduction necessary to reach the final contaminant concentration required.

If the desired contaminant concentration has not been reached, steps 30, 40, 50, 60 and 70 are repeated: additional permanganate is added to the mixture (e.g. part or the whole of the remaining fraction of the necessary quantity), the soil and permanganate are mechanically mixed until the activation of the permanganate (exothermic chemical reaction), a minimal amount of water is added after the soil temperature reached the minimum temperature $T_1$ if necessary, and the mixture of soil, permanganate and water is then mechanically mixed, preferably in a continuous manner, as detailed above. It has been found that the sequence in which the addition of $KMnO_4$ and water is performed has a direct effect on the treatment efficiency, as well as on the mixture consistency. As such, for maximum efficiency, the $KMnO_4$ is added when the soil is as dry as possible, and water, if required, is added after the addition and activation of the $KMnO_4$.

During the treatment, the pH of the soil typically raises considerably (for example between 9 and 10). As such, after the desired contaminant concentration is reached and as indicated in step 90, the pH of the soil mixture is adjusted to a substantially neutral point, which in a particular embodiment is defined by a pH between 7 and 8, by the addition of acid. In a particular embodiment citric acid in granular form is used, although any other adequate acid can alternately be used.

Alternately or in addition, the acid can be added in the soil mixture at any time after the oxidation process has begun, for example any time the pH exceeds a given limit which in a particular embodiment is 9.5, thus allowing the pH to be controlled as the contaminants are being oxidized while still ensuring that the pH is substantially neutral after step 80. The addition of acid during the oxidation process advantageously increases the efficiency of that process, but however increases the costs as well since the required quantity of acid and the number of necessary manipulations during the process are both increased.

In the embodiment shown, the pH of the soil mixture is adjusted to substantially neutral conditions before letting the soil mixture rest since permanganate oxidation is more effective in a neutral environment. When the pH is elevated, permanganate precipitates to $MnO_2$ and as such is no longer available for chemical oxidation, thus reducing the potential of the contamination reduction which could occur in the resting state of the soil mixture. The increase of the oxidation power of the permanganate is as follows:

In addition, in a neutral environment the production of the $MnO_2$ by-products by the oxidation reaction, which are as such introduced in the soil, is mitigated by the neutral pH of the soil which minimizes leading of the $MnO_2$ and as such salting out of Mn within the soil matrix.

As shown in step 110, the preferably neutral soil mixture is deposited in an adequate location to rest in order for further oxidation to occur. The rest curing time varies depending on the desired final contaminant concentration and is typically between a few weeks and a few months. In a case where the mechanical mixing is performed ex-situ, the soil mixture is preferably deposited either in the excavation where the contaminated soil was extracted or in a curing cell in order for the oxidation to continue. This additional oxidation can advantageously produce an additional contaminant reduction up to 20%, depending on the contaminant reduction reached at step 80 and on the residual permanganate left in the soil after step 80. In some cases, the contaminant concentration evaluated at step 80 is judged to be satisfactory as a final contaminant concentration and the permanganate has entirely reacted with the soil and its contaminants, and as such no additional oxidation occurs during step 110.

As shown in step 100, an optional step of adding a final quantity of permanganate to the soil mixture can be performed before the soil mixture is deposited in its resting location, in order to ensure that residual permanganate is present for the oxidation process to continue, if required. In a particular embodiment, the final quantity of permanganate added is between approximately 25 Kg and approximately 100 Kg for each 2 m³ of soil mixture.

The above described method has been shown to produce satisfactory contaminant reduction, which in particular embodiments has reached a maximum reduction level of 90% for hydrocarbons.

The above described method advantageously significantly reduces the treatment time of permanganate oxidation and increase the efficiency of the oxidation, which allows for permanganate oxidation to be more effectively performed, in particular in cold climates where standard permanganate oxidation processes cannot be efficiently used.

Experiments

Lab Tests

A first series of laboratory experiments was performed to compare other known oxidant with permanganate and evaluate the performance of the activated permanganate oxidation process which is generated using solid mechanical mixing of soil and solid potassium permanganate.

A set of 25 batch tests were performed using a 500 cc stainless steel reactor at ambient temperature. Four types of oxidizing agent were tested, namely Fenton's Reagents, peroxide without catalyst, potassium permanganate and sodium persulfate, at different doses. The oxidant loading varied between 4 and 60 g of oxidant per g of total petroleum hydrocarbons (TPH).

Bench-scale testing was performed using permanganate in completely mixed reactors to remove total petroleum hydrocarbons (TPH) from diesel impacted soil. The soil used to perform the bench-scale study came from samples taken at a site impacted by diesel, coming from boreholes and surface soil collected at two depth intervals (0-15 cm and 15-30 cm) using a shovel. The mean TPH concentration in the native soil used was 3600 mg/kg.

The first set of experiment was performed in a slurry mode with no activation of the permanganate with a treatment time of 7 days. The treatment of soil using a potassium permanganate solution at a concentration of 40 g/l, corresponding to a dose of 15 g permanganate per g of TPH, produced an overall removal efficiency of 70%. Further increase of the permanganate dose (over 60 g per g of PH $C_{10}$-$C_{50}$) did not produce an increase of the overall removal efficiency. The highest removal efficiency reached was 70.2% which corresponds to a TPH concentration of 980 mg/kg after treatment.

Figure 2:
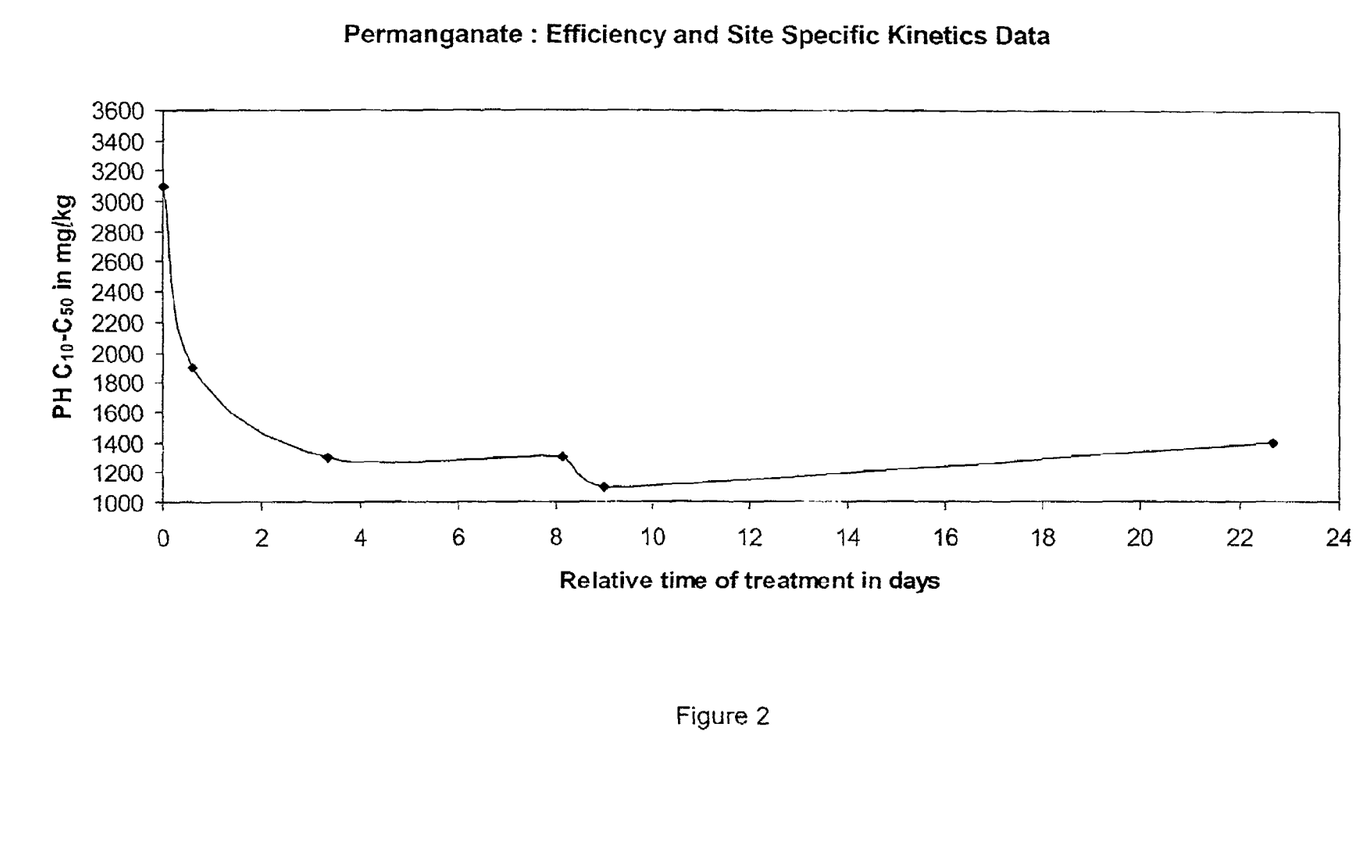
FIG. 2 is a graphical representation of the petroleum hydrocarbon concentration as a function of treatment time obtained in a laboratory oxidation test using permanganate.

The kinetics test has revealed that the chemical oxidation reaction is very slow. The kinetic test data are shown in FIG. 2 where the concentration of TPH (PH $C_{10}$-$C_{50}$) is plotted against time since the permanganate injection into the batch reactor.

The rate constant of the reaction (chemical oxidation) was determined using the integral method. It must be pointed out that the chemical oxidation of PH $C_{10}$-$C_{50}$ using permanganate is a second order reaction which means that the reaction rate is a function of the permanganate and PH $C_{10}$-$C_{50}$ concentrations. However, when the permanganate is maintained in excess (high dose), it can be assumed that the reaction follows pseudo first-order kinetics (Elements of Chemical Reaction Engineering, second edition, H. Scott Fogler, 1992).

The rate constant of a first-order reaction corresponds to the slope of the plot of natural logarithm of ($HP_o$/HP) as a function of time, where $HP_o$ is the initial concentration of PH $C_{10}$-$C_{50}$ and HP the concentration of PH $C_{10}$-$C_{50}$ at specific time. A rate constant of 0.31 day-1 was calculated which means that 63% of the TPH is removed in 3.2 days.

The Fenton's Reagent tests performed revealed that the overall removal efficiency were below 50%.

Sodium persulfate was tested alone or with the co-injection of peroxide to treat the soil. Batch testing has revealed that highest efficiency (53.0%) was obtained with the co-injection of peroxide and persulfate.

Pilot Test

Base on the lab tests, an ex-situ pilot test was designed in order to increase the removal efficiency and reduce the treatment time of the permanganate.

This pilot test involved the mixing of slurry composed of impacted excavated soil, potassium permanganate and water in 9 cubic feet concrete mixers. The mechanical activation was produced by mixing the solid permanganate and impacted soil in the mixers before the addition of water for a period of 15 minutes. The soil was saturated with the oxidant solution and the water content was adjusted between 20 and 30% W/W. The mixer was agitated continuously during the test to reach optimal contact between the oxidant solution and the soil, and the total reaction time was fixed between 36 hours and 10 days. The pH was adjusted during the treatment to decrease the pH from 10 to neutral conditions by adding nitric acid periodically to favor the permanganate oxidation. The following typical results were obtained after the end of the 10 day period:

$C_4$-$C_{10}$: average final concentration of 1.6 ppm (96% reduction);

$C_{11}$-$C_{16}$: average final concentration of 690 ppm (86% reduction);

$C_{17}$-$C_{34}$: average final concentration of 243 ppm (33% reduction);

$C_{35}$-$C_{50}$: below detection limit; and $C_{10}$-$C_{50}$ (TPH): average final concentration of 990 ppm (83% reduction).

Figure 3:
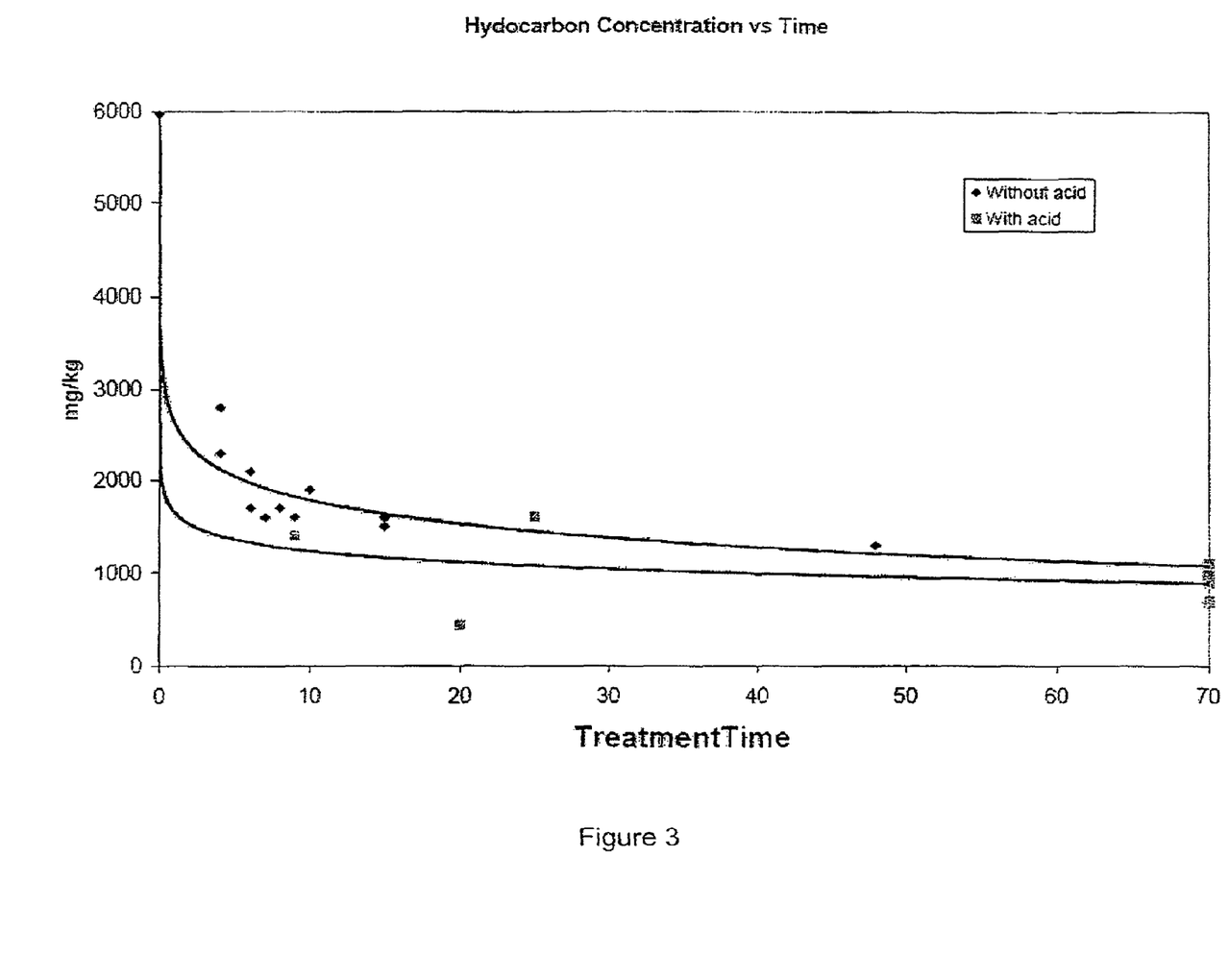
FIG. 3 is a graphical representation of a TPH reduction as a function of treatment time obtained in a pilot test using permanganate.

FIG. 3 shows the TPH reduction as a function of the treatment time with and without acid addition, where the treatment time is indicated in days.

Additional Tests

Additional permanganate oxidation tests were performed using horizontal "U" shaped blenders with a capacity of 3.17 cubic meters (2.74 m length, 1.07 m width and 1.19 m depth) and with an effective mixing volume of 2.41 cubic meters, using the method of the present invention as set forth in FIG. 1 and in the description above. These tests were performed to optimize the mechanically ex-situ activated permanganate oxidation process. Results were obtained less then 20 hours after the start of the reaction. Table 2 shows sample results of these additional tests for each of 3 different sites, where each sample has a mass of 4.2 metric tons and a volume of 2.1 m³.

TABLE 2

| Site | Dosage g KMnO4/ g soil | TPH INITIAL ppm | TPH FINAL ppm | Efficiency % | $C_{11}C_{16}$ INITIAL ppm | $C_{11}C_{16}$ FINAL ppm | Efficiency % |
| --- | --- | --- | --- | --- | --- | --- | --- |
| No. 1 | 11.0 | 3100 | 774 | 75.0 | 1800 | 373 | 79.3 |
|  | 12.6 | 4500 | 851 | 81.1 | 2100 | 410 | 80.5 |
|  | 5.2 | 12000 | 3100 | 74.2 | 6000 | 1200 | 80.0 |
| No. 2 | 16.2 | 2100 | 457 | 78.2 | 1700 | 280 | 83.5 |
|  | 24.0 | 2600 | 669 | 74.3 | 2000 | 410 | 79.5 |
|  | 33.1 | 1200 | 330 | 72.5 | 970 | 210 | 78.4 |
| No. 3 | 15.4 | 4800 | 1276 | 73.4 | 3200 | 610 | 80.9 |
|  | 13.1 | 3900 | 1276 | 67.3 | 2480 | 610 | 75.4 |

The soil was then deposited in curing cells in order for additional contamination oxidation to occur.

The embodiments of the invention described above are intended to be exemplary. Those skilled in the art will therefore appreciate that the foregoing description is illustrative only, and that various alternate configurations and modifications can be devised without departing from the spirit of the present invention. Accordingly, the present invention is intended to embrace all such alternate configurations, modifications and variances which fall within the scope of the appended claims.

The invention claimed is:

1. A method for decontaminating soil comprising:
   (a) adding solid oxidant to the soil;
   (b) mechanically mixing the oxidant with the soil until an exothermic reaction occurs between the oxidant and contaminants within the soil;
   (c) adding water to obtain a homogeneous mix between the soil and the oxidant while keeping a temperature of the soil above a minimum temperature threshold;
   (d) mechanically mixing the soil with the oxidant and the water until the reaction between the oxidant and the contaminants is determined to have slowed down below a given threshold; and
   (e) ensuring that a pH of the soil is substantially neutral after step (d) by adding acid to the soil at any time after step (a).

2. The method according to claim 1, wherein steps (a) and (b) are repeated until a temperature of the soil exceeds the minimum temperature threshold.

3. The method according to claim 1, wherein the minimum temperature threshold is about 60° C.

4. The method according to claim 1, wherein steps (a) through (d) are repeated until a desired contaminant concentration is reached.

5. The method according to claim 4, wherein before step (a) a required oxidant quantity is determined based on the desired contaminant concentration, and step (a) includes adding the oxidant in an amount corresponding to a fraction of the required oxidant quantity.

6. The method according to claim 1, further comprising after step (e) a step of letting the substantially neutral soil rest for further reaction between the oxidant and the contaminants to occur.

7. The method according to claim 6, further including adding additional oxidant to the substantially neutral soil before letting the substantially neutral soil rest.

8. The method according to claim 1, wherein step (c) includes adding water to obtain a soil water content of between approximately 5% W/W and approximately 8% W/W.

9. The method according to claim 1, wherein step (b) includes mechanically mixing the oxidant with the soil in a continuous manner for a period lasting between 5 minutes and 20 minutes.

10. The method according to claim 1, wherein step (d) includes mechanically mixing the soil with the oxidant and the water in a continuous manner.

11. The method according to claim 1, wherein step (d) includes mechanically mixing the soil with the oxidant and the water for a period lasting between 4 hours and 20 hours.

12. The method according to claim 1, wherein step (a) includes adding between 5 and 20 g of the oxidant per g of the contaminants.

13. The method according to claim 1, wherein before step (a) the soil is excavated and put in an ex-situ mixer, and steps (a) through (e) are performed in the ex-situ mixer.

14. The method according to claim 1, wherein step (c) is only performed after step (b).

15. The method according to claim 1, wherein in step (d) the reaction between the oxidant and contaminants is determined to have slowed down below the given threshold based on at least one of a temperature variation of the soil and a color variation of the soil during step (d).

16. The method according to claim 1, wherein the oxidant is permanganate.

17. A method of performing soil decontamination comprising mechanically mixing the soil with solid oxidant prior to any addition of water and until an exothermic reaction between the oxidant and contaminants within the soil occur, adding only necessary water during decontamination to obtain an homogeneous mix between the soil and the oxidant, and mechanically mixing the soil with the oxidant and the water for a predetermined period of time to allow the oxidant to at least partially oxidize the contaminants.

18. A method of performing decontamination comprising mechanically mixing the soil with solid oxidant prior to any addition at water and until an exothermic reaction between the oxidant and contaminants within the soil occur, adding only necessary water to obtain an homogeneous mix between the soil and the oxidant, mechanically mixing the soil with the oxidant and the water for a predetermined period of time to allow the oxidant to at least partially oxidize the contaminants, and adding acid to the soil to ensure that a pH of the soil is substantially neutral after the predetermined period of time.

19. The method according to claim 17, wherein the water is added such as to obtain a soil water content of between approximately 5% W/W and approximately 8% W/W.

20. The method according to claim 17, wherein the predetermined period of time is between 4 hours and 20 hours.

21. The method according to claim 17, wherein mixing of the soil with the oxidant prior to any addition of water is performed in a continuous manner for a period lasting between 5 minutes and 20 minutes.

22. The method according to claim 17, wherein mixing of the soil with the oxidant prior to any addition of water is performed until a soil temperature reaches a temperature threshold of between about 40° C. and about 80° C., a quantity of the oxidant being selected to reach the temperature threshold.

23. The method according to claim 17, wherein the oxidant is permanganate.

* * * * *